United States Patent [19]

Sheratte et al.

[11] 4,212,953
[45] Jul. 15, 1980

[54] FIRE-RETARDANT POLYURETHANE FOAMS

[75] Inventors: Martin B. Sheratte, Canoga Park; Lydia H. Simanyi, Santa Ana, both of Calif.

[73] Assignee: McDonnell Douglas Corporation, Long Beach, Calif.

[21] Appl. No.: 938,988

[22] Filed: Sep. 1, 1978

[51] Int. Cl.$^2$ .................. C08G 18/14; C08G 18/38; C08G 18/62
[52] U.S. Cl. ................... 521/137; 260/956; 260/957; 521/107; 521/168; 521/906; 526/274; 526/277; 526/278
[58] Field of Search .............. 521/107, 137, 168, 906; 528/51; 260/956, 957; 526/274, 277, 278

[56] References Cited

U.S. PATENT DOCUMENTS

| | | | |
|---|---|---|---|
| 2,577,281 | 12/1951 | Simon et al. | 521/168 |
| 3,079,417 | 2/1963 | Farrar | 260/956 |
| 3,544,509 | 12/1970 | Carroll et al. | 521/168 |
| 3,868,431 | 2/1975 | Hutchinson | 521/137 |
| 3,936,514 | 2/1976 | Shim | 521/906 |
| 3,948,826 | 4/1976 | Smalheiser | 521/137 |
| 4,111,828 | 9/1978 | Wang | 521/107 |
| 4,129,710 | 12/1978 | Jin | 521/137 |

*Primary Examiner*—H. S. Cockeram
*Attorney, Agent, or Firm*—Max Geldin

[57] ABSTRACT

Production of urethane foams of increased fire resistance by mixing an ethylenic, e.g. allyl or vinyl, phosphorus compound with a polyol and polymerizing the polyol with polyisocyanate while simultaneously polymerizing the ethylenic phosphorus compound with a suitable catalyst to form an interpenetrating network of urethane polymer and phosphorus-containing polymer.

20 Claims, No Drawings

FIRE-RETARDANT POLYURETHANE FOAMS

BACKGROUND OF THE INVENTION

This invention relates to polyurethane foams having increased fire resistance, and is particularly concerned with the production of fire resistant polyurethane foams by incorporation of certain phosphorus compounds into the foams.

It is known in the prior art that the fire resistance of polyurethane foams can be increased by chemical incorporation of phosphorus compounds into the foams. Thus, for example, U.S. Pat. No. 3,986,990 discloses polymerizing polyalkylene glycol alkyl polyphosphites with or without additional polyols, with selected isocyanates, thereby producing polyurethane foams in which these polyphoshites are chemically incorporated into the polyurethane network. U.S. Pat. No. 3,989,652 discloses the preparation and subsequent incorporation of polyalkylene glycol alkyl or halo-alkyl polyphosphonates into the polyurethane polymer chain by chemical bonds.

In the above prior art, the attachment is chemical via a reaction between the isocyanate and an active hydrogen which is part of the phosphorus-containing molecule. This results in incorporation of the phosphorus atom into the main polymer backbone which leads to loss of commercially attractive properties, such as softness and resilience in flexible foams, and lack of friability in rigids. Susceptibility to hydrolysis is also increased for both rigid and flexible foams. These problems are so acute for flexible foams that present commercial practice is to introduce the phosphorus in a non-reactive form, e.g. as tris-(2-chloroethyl phosphate). This results in a small degree of plasticizing, but more importantly, the fire retardant is simply dissolved in the foam polymer, and in due course it diffuses out, and hence fire retardance is lost.

It is known to copolymerize two different monomer moieties resulting in the formation of two intertwined but chemically separate networks. Thus, Belgian Pat. No. 843,641 discloses simultaneous polymerization of a polyol and a polyisocyanate, together with polymerization of an ethylenically unsaturated monomer such as a substituted styrene, e.g. mono-chlorostyrene, to form intertwined networks of polyurethane and polymerized ethylenic monomer.

SUMMARY OF THE INVENTION

One object of the present invention is the provision of fire retardant polyurethane foams.

Another object is to provide fire resistant polyurethane foams comprised of an interpenetrating network of urethane polymer and ethylenic polymer containing phosphorus, which may not be chemically bonded, and affording versatility of physical properties, such as softness and resilience in flexible foams and low friability with rigid foams.

A still further object is to provide fire retardant polyurethane foam compositions of the above type wherein the ethylenic polymer portion contains phosphorus and confers fire resistant properties on the resulting urethane foam without adversely affecting the physical properties of the foam, such as softness and resilience in flexible foams.

Yet another object is the provision of a simple essentially one step polymerization procedure for producing the above fire resistant polyurethane foam compositions.

According to the present invention, the above advantages are achieved and a fire resistant polyurethane foam composition is provided comprising an interpenetrating network of urethane polymer and phosphorus-containing polymer.

The incorporation of the phosphorus-containing compound as fire retardant into the polyurethane foam is carried out by simultaneous polymerization and formation of catenanes of ethylenic, e.g. allylic and vinyl, phosphorus systems with the polyurethane system. This is achieved by mixing the ethylenic phosphorus-containing monomer, e.g. allyl or vinyl phosphorus compound, with the polyol, adding a suitable catalyst such as benzoyl peroxide, and isocyanate, and additional, e.g. tertiary amine and/or tin catalyst, and then proceeding to polymerize the polyurethane starting material in the usual manner. The ethylenic phosphorus-containing monomer may also be premixed with the isocyanate, followed by normal polymerization of the isocyanate and polyol with suitable catalysts, as noted above.

By including the unsaturated phosphorus-containing monomer and its catalyst in the polymerizing urethane mixture of polyol and isocyanate, the unsaturated monomer and the urethane monomer polymerize independently but at the same time, forming an interpenetrating polymer network in which the resulting phosphorus-containing polymer and the urethane polymer are intertwined or entangled with each other physically.

The resulting urethane foam composition has the advantages that the phosphorus-containing polymer contributes increased flame retardance to the composition while at the same time improving the physical, mechanical and bonding properties of the modified urethane foam. Thus, the flame retardant urethane foam of the invention can be tailored as by varying the proportions of phosphorus-containing ethylenic monomer in the initial mixture to afford a urethane foam which is flexible and resilient, and suitable for use as cushioning materials, or to form rigid foams, having improved flexural and compressive strengths.

In contrast to the above prior art U.S. patents, in the present invention the phosphorus is not a part of either the urethane polymer backbone or the polymer backbone derived from the ethylenic monomer. The phosphorus atom is not involved in any way in the urethane polymerization, and it is present only as a pendant group on the polymer formed from the ethylenic phosphorus-containing monomer. Thus, the effect of the phosphorus atom itself on the mechanical properties of the foam are minimal, and since the presence of the ethylenic network actually provides commercially attractive properties—high resilience in the flexibles, and high strength coupled with low friability for the rigids—the flame retardant foams of our invention have properties which are superior to those of the corresponding nonflame retarded foams which contain no phosphorus; and adding more flame retardant tends to upgrade the foams hereof instead of downgrading them as it does in the case of the prior art.

The present invention thus avoids the disadvantage of the employment of expensive phosphorus-containing polyols of the type employed for reaction with isocyanate in the above U.S. patents, and also avoids the disadvantage of such patents, namely, that where too much of the phosphorus-containing polyol material of these patents is used, it has a deleterious effect on the physical properties of the foam, particularly in the case of flexible foams.

An additional important advantage of producing the fire retardant urethane foam compositions of the invention is that the flame retardant materials, that is the ethylenic phosphorus-containing monomer compounds, can be incorporated into the urethane foam compositions effectively, without requiring any additional chemical processing steps; in other words, the polymerization of the ethylenic phosphorus-containing monomer occurs simultaneously with the basic polymerization of the urethane components, namely the polyol and isocyanate, to produce the desired urethane foam composition in a single polymerization step. In addition, the polyol and phosphorus-containing, e.g. vinyl or allyl, ethylenic monomer solutions, can be mixed and stored for extended periods of time without reaction, if a small amount of a free radical inhibitor, such as hydroquinone is added to the mixture, e.g. in an amount ranging from about 0.01 to about 1.0% by weight.

The urethane polymers, as previously noted are produced by reaction of polyisocyanates, particularly diisocyanates with, for example, suitable organic polyfunctional polyol reactants. A wide variety of organic diisocyanates can be used, among which are included aromatic diisocyanates, such as m-phenylene diisocyanate, 4-methoxy-m-phenylene diisocyanate, 4-phenoxy-m-phenylene diisocyanate, 4-chloro-m-phenylene diisocyanate, toluene diisocyanates (either as a mixture of isomers, e.g., the commercially available mixture of 80%, 2,4-toluene diisocyanate and 20% 2,6-toluene diisocyanate, or as the individual isomers themselves), polyphenyl polymethylene polyisocyanate, corresponding to the material marketed as PAPI, and other polyisocyanates.

The most important active hydrogen-containing reactants for reaction with the polyisocyanates to produce polyurethanes are hydroxyl-containing compounds such as the glycols, polyols, hydroxyl-rich polyesters and various polyethers. These include diols or polyols such as polypropylene glycol, tetramethylene glycol and its polymers, trimethylol propane and the like.

Another class of suitable organic polyfunctional polyol reactants includes polyalkylene ether polyols containing more than two reactive hydroxyl groups, such as polyalkylene ether triols, tetrols, and the like, which are prepared, for example, by reacting polyols such as glycerol, trimethylol propane, pentaerythritol, dipentaerythritol, sucrose, sorbitol and the like, or amines such as ethanolamine, ethylene diamine, diethylene triamine, and the like, with lower alkylene oxides such as ethylene oxide, propylene oxide and the like.

Polyesters containing a plurality of isocyanate-reactive hydroxyl groups constitute another class of reactive organic polyfunctional polyols which may be employed in preparing polyurethane resins. While the preparation of polyesters suitable for this purpose has been described in great detail in the prior art and forms no part of the present invention per se, it may be mentioned here by way of illustration that polyesters of this type may be prepared by the condensation of a polyhydric alcohol, generally a saturated aliphatic diol such as ethylene glycol, propanediol-1,2, propanediol-1,3, butanediol-1,3, butanediol-1,4, pentanediol-1,2, pentanediol-1,5, hexanediol-1,3, hexanediol-1,6, diethylene glycol, and the like, with a polycarboxylic acid or anhydride, generally a dicarboxylic acid or anhydride which is either saturated or which contains only benzenoid unsaturation, such as oxalic, malonic, succinic, glutaric, adipic, pimelic, suberic, azelaic, and the like, acids.

The urethane polymerization reaction is usually base catalyzed, although free-radical generating catalysts can also be employed, and employing proportions of the isocyanate and polyol components so as to obtain an equivalent number of hydroxyl and isocyanate groups.

Modifications can be made in the polyurethane reaction mixture to provide resins having various degrees of flexibility, rigidity and other properties as is well known in the art. These include varying the mol ratio of polyisocyanate to polyol and in employing tri- or higher functional polyols and polyisocyanates.

The phosphorus-containing unsaturated monomer which is polymerized simultaneously with the polyol and isocyanate, are phosphorus-containing ethylenic monomers, or phosphorus-containing vinyl monomers, containing the vinyl or substituted vinyl group, the latter terms including allyl and substituted allyl groups. These compounds can include vinyl and divinyl phosphates, phosphine oxides, phosphines, phosphites, phosphonates and phosphinates, and homologues thereof, e.g. the corresponding allyl compounds. Such monomers are inert toward the polyol and the polyisocyanate components of the starting mixture.

Thus, for example, the following specific classes of phosphorus-containing ethylenic or vinyl monomers can be employed.

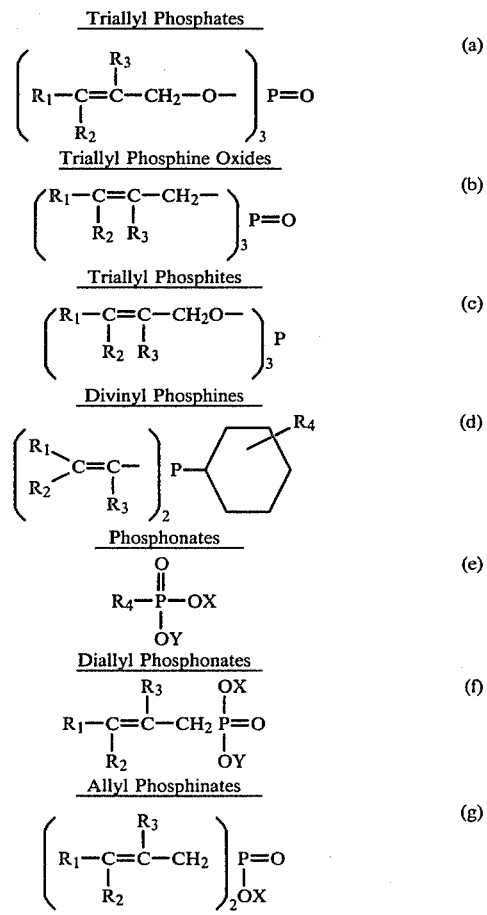

In the above formulae, $R_1, R_2, R_3$ and $R_4$ are each H, alkyl such as methyl ethyl, isopropyl, etc., e.g. of from about 1 to about 20, preferably 1 to about 4, carbon atoms, aryl such as phenyl, tolyl, naphthyl, and the like, of from 6 to about 24, preferably 6 to about 8, carbon atoms; halogen such as chlorine, bromine and iodine, or any combination thereof; and X and Y are ethylenically unsaturated groups such as vinyl, allyl and the like.

A particularly preferred phosphorus-containing ethylenic monomer for purposes of the invention is triallyl phosphate. Other specific examples include diallyl benzene phosphonate, allyl bis-benzene phosphinate, dimethyl propene phosphonate, and dibutyl propene phosphonate.

As previously noted, the starting mixture is prepared by mixing the polyol, isocyanate and catalyst for the polyurethane polymerization, such as an amino or tin compound, e.g. N,N,N'N'-tetramethyl diamino propyl ether or dibutyl tin dilaurate, together with the desired amount of phosphorus-containing ethylenic component, and additional catalyst for the ethylenic monomer polymerization, e.g. an organic peroxide such as hydrogen peroxide, benzoyl peroxide, or methyl ethyl ketone peroxide, and simultaneously polymerizing the polyol and isocyanate to form urethane polymer, and polymerizing the phosphorus-containing ethylenic monomer, to form phosphorus-containing polymer, with three-dimensional lattices. The reaction proceeds under autogenously generated temperatures ranging from about 20° to about 160° C., usually in the range of 20°–140° C. at atmospheric pressure. Higher temperatures may be required where higher molecular weight ethylenic monomers are employed. Polymerization is usually complete in a few minutes, e.g. about 2 to about 10 minutes.

Generally, a minor amount of phosphorus-containing ethylenic monomer is employed with respect to the amount of polyol component. The amount of such phosphorus-containing monomer component can range broadly from about 1 to about 60% by weight of the polyol component. The tendency of polyurethane foams to self-extinguish is greatly improved by the addition of relatively small amounts of the phosphorus-containing component within the above range, to the initial polymerization mixture, e.g. ranging from about 5 to about 20% by weight of the polyol component. While more substantial additions of such phosphorus-containing component, e.g. triallyl phosphate, within the broad range, e.g. from about 20% to about 40% by weight of the polyol compound, yield good foams without thermal cracking, the flame retardance may not be greatly enhanced over the use of the smaller amounts of the phosphorus-containing monomer, such as triallyl phosphate.

The resulting foam comprised of an interpenetrating network of urethane polymer and phosphorus-containing polymer formed from the ethylenic monomer, contains about 1 to about 30%, preferably about 1 to about 20%, of the latter polymer, by weight of the foam composition, the remainder being urethane polymer.

The following are examples of practice of the invention.

EXAMPLE 1

A series of foam formulations were prepared by mixing 43.8 grams PAPI 135, a commercial polyisocyanate, amine number 133, and 50 grams of Reichhold Polyol #98-080 having a hydroxyl number of 354. Into this mixture was introduced one drop of NIAX catalyst, which is understood to be tetramethyl diamino propyl ether, and one drop of 30% hydrogen peroxide, along with varying amounts of triallyl phosphate, as noted in Table 1 below. In each case the unsaturated phosphorus-containing monomer, triallyl phosphate, and the urethane components (polyol and polyisocyanate) polymerized independently but at the same time to form an interpenetrating polymer network in which the resulting phosphorus-containing polymer and the urethane polymer were entangled with one another physically. The resulting rigid foams had excellent cell structure and showed no thermal cracking.

A control was prepared using the same starting components and proportions noted above, but omitting the triallyl phosphate and peroxide catalyst.

Table I shows the data for these runs, including the time period which was required for the foam in each case to self-extinguish. This was determined according to the requirements of ASTM Test D 3014—Flammability of Rigid Cellular Plastics.

Table I

| Formulation No. | Trially Phosphate (g) | Period Which it Takes for Foam to Self-extinguish (sec) |
| --- | --- | --- |
| 1 (control) | 0.0 | 15 |
| 2 | 3.0 | 5 |
| 3 | 5.5 | 2 |
| 4 | 16.4 | 2 |
| 5 | 9.5 | 2 |

Table I shows the substantial improvement in fire retardancy of the foam containing triallyl phosphate as compared to the control.

In Table II below are noted the data for the physical properties of the respective foams which were produced.

Table II

| Formulation No. | Cream Time (sec) | Gel Time (sec) | Tack-free Time (sec) | Rise Time (sec) | Density |
| --- | --- | --- | --- | --- | --- |
| 1 | 37 | 160 | 175 | 210 | 2.23 |
| 2 | 33 | 135 | 150 | 180 | 2.41 |
| 3 | 40 | 130 | 140 | 180 | 2.67 |
| 4 | 80 | 200 | 280 | 400 | 3.62 |
| 5 | 27 | 80 | 100 | 110 | 2.9 |

EXAMPLE 2

A series of runs was made in preparing rigid urethane foams from starting mixtures, some of which contained triallyl phosphate according to the invention, while others (the controls) contained no ethylenic phosphorus monomer compound, as noted in Table III below.

In the case of those formulations containing triallyl phosphate, the polyol blend was prepared and the silicone oil and catalyst (Dabco R-8020) were dissolved into it. Triallyl phosphate and benzoyl peroxide were then added and stirred until dissolved. The Freon-F-11 was added and blended in, and then the polyisocyanate was mixed into the mixture using a high shear agitator. Blending was continued for 15 seconds and then the mixture was allowed to foam and rise in the usual manner.

The control foams were prepared in the above manner but without incorporating any triallyl phosphate and benzoyl peroxide.

The data for the mixtures prepared and the data for reaction time and properties of the final urethane foam are set forth in Table III below.

Table III

| | FOAMS | | | | | | |
|---|---|---|---|---|---|---|---|
| | A | B | C | D | E | F | G |
| A. Formulations | (grams) | | | | | | |
| Multranol E-9136[1] | 100 | 100 | 70 | 70 | 70 | 70 | 70 |
| Multranol 4050[1] | — | — | 30 | 30 | — | — | — |
| Multranol 4051[1] | — | — | — | — | 30 | 30 | 30 |
| DC 193[2] | 1.5 | 1.6 | 1.5 | 1.6 | 1.5 | 1.6 | 1.6 |
| Dabco R-8020[3] | 1.0 | 1.0 | 1.0 | 1.0 | 1.0 | 1.0 | 1.0 |
| Freon F-11 | 30 | 33 | 30 | 33 | 30 | 33 | 36 |
| Mondur MR[4] | 117 | 117 | 129 | 129 | 117 | 117 | 117 |
| Triallyl Phosphate | — | 10 | — | 10 | — | 10 | 20 |
| Benzoyl Peroxide | — | 0.1 | — | 0.1 | — | 0.1 | 0.2 |
| B. Reaction Times | | | | | | | |
| Cream Time (sec) | 25 | 25 | 20 | 20 | 20 | 20 | 20 |
| Gel Time (sec) | 80 | 90 | 65 | 70 | 65 | 70 | 75 |
| Rise Time (sec) | 160 | 170 | 150 | 160 | 146 | 160 | 170 |
| C. Properties | | | | | | | |
| Density (pcf) | 2.0 | 2.1 | 2.1 | 2.0 | 2.1 | 2.0 | 2.1 |
| Compressive Strength (psi)[5] | 49.6 | 55.1 | 48.8 | 56.4 | 47.3 | 52.4 | 56.1 |
| Self Extinguishing (sec) | 35 | 5 | 30 | 3 | 30 | 3 | 2 |

(1) Commercial polyol blends—Mobay Chemical Corp.
(2) Dow Corning Corporation. Silicone surfactant
(3) Air Products and Chemicals. Catalyst
(4) Polymeric isocyanate. Mobay Chemical Corp.
(5) ASTM D-1621 (test carried out parallel to the direction of foam rise)

The foams B, D, F and G employing triallyl phosphate were comprised of an interpenetrating network of polymerized triallyl phosphate and polyurethane. The resulting foams of these runs self-extinguished in a period of three to five seconds, whereas the foams A, C and E, not containing triallyl phosphate, on the other hand, required 30 to 35 seconds for self-extinguishing.

It is further noted that the foams B, D, F and G had higher compressive strengths than the foams produced in the absence of triallyl phosphate, that is the foams, A, C and E.

EXAMPLE 3

Example 2 is essentially followed except employing in place of triallyl phosphate, diallyl benzene phosphonate and allyl bis-benzene phosphinate, respectively.

Results similar to those of Example 2 are obtained.

EXAMPLE 4

A series of runs was made in preparing flexible urethane foams from starting mixtures, which contained diallyl benzene phosphonate according to the invention. One run (the control) contained no ethylenic phosphorus monomer compound, as noted in Table IV below.

Table IV

| | H | I | J | K |
|---|---|---|---|---|
| | (grams) | | | |
| A. Formulations | | | | |
| Multranol 7100 [1] | 100 | 100 | 100 | 100 |
| Mondur TD-80[2] | 35 | 35 | 35 | 35.5 |
| Freon F-11 | 5 | 7 | 9 | 12 |
| Water | 4.6 | 4.6 | 4.6 | 4.7 |
| Catalyst E-9400 | 0.08 | 0.08 | 0.08 | 0.06 |
| Silicone Surfactant | 1.0 | 1.0 | 1.2 | 1.3 |
| Stannous Octoate | 0.27 | 0.27 | 0.27 | 0.27 |
| Diallyl benzene Phosphonate | — | 5 | 10 | 15 |
| Benzoyl Peroxide | — | 0.05 | 0.1 | 0.15 |
| B. Physical Properties | | | | |
| Density (pcf) | 1.20 | 1.20 | 1.22 | 1.25 |
| Tensile strength (psi) | 14.5 | 17.5 | 20.5 | 21.8 |
| Elongation (%) | 245 | 250 | 255 | 265 |
| ILD (lb/50 in$^2$) | | | | |
| 25% | 27 | 29 | 31 | 33 |
| 65% | 55 | 67 | 74 | 96 |
| SAG factor | 2.0 | 2.3 | 2.4 | 2.9 |
| Self Extinguishing (Sec) | ∞ | 20 | 10 | 5 |

(1)Commercial polyol blends - Mobay Chemical Corp.
(2)Mixture of 2,4- and 2,6-Toluene di-isocyanates in the ratio 80:20. Isocyanate Index 108-.Mobay Chemical Corp.
ILD - Indentation Load Deflection
SAG factor - measure of foam resiliency
∞ - Control H continued burning and did not self extinguish Note the improved self-extinguishing characteristics and the improved tensile strength, elongation and resiliency of the foams containing diallyl benzene phosphonate according to the invention, over the control foam prepared omitting the latter phosphonate compound.

The formation of interpenetrating networks between the polymerized ethylenic phosphorus compounds noted above and polyurethanes is applicable to rigid foams, flexible foams, adhesives, coatings, and the like.

From the foregoing, it is seen that the present invention provides novel procedure for producing novel fire retardant polyurethane foam compositions having wide applicability, and whose physical properties can be varied as desired, by distributing a flame retardant interpenetrating polymeric phosphorus compound produced from a phosphorus-containing ethylenic monomer, uniformly throughout the polyurethane, without requiring additional chemical steps in the production of the interpenetrating polymer, and formation of catenanes between the polymerized ethylenic phosphorus compound and the polyurethane system, wherein the phosphorus atom is present as part of a pendant group on the phosphorus-containing polymer.

While particular embodiments of the invention have been described for purposes of illustration, it is understood that other modifications and variations will occur to those skilled in the art, and the invention accordingly is not to be taken as limited except by the scope of the appended claims.

What is claimed is:

1. A fire resistant polyurethane foam composition comprising an interpenetrating network of polyether based urethane polymer and phosphorus-containing polymer, the phosphorus being present as a pendant group on said last mentioned polymer, said phosphorus-containing polymer being derived from a monomer selected from the group consisting of:

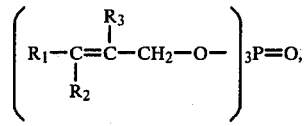

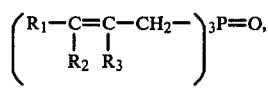

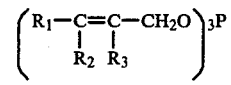

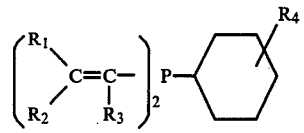

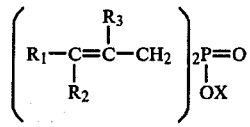

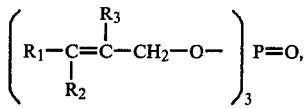

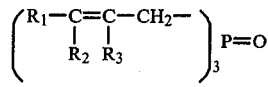

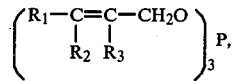

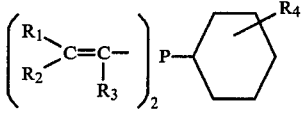

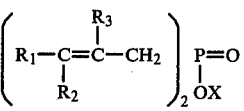

wherein $R_1$, $R_2$, $R_3$ and $R_4$ are each selected from the group consisting of H, alkyl of from about 1 to about 20 carbon atoms, aryl of from 6 to about 24 carbon atoms, and halogen; and X is vinyl or allyl.

2. The polyurethane foam composition as defined in claim 1, said phosphorus-containing polymer being derived from allyl bis-benzene phosphinate.

3. The polyurethane foam composition as defined in claim 1, said alkyl containing from about 1 to about 4 carbon atoms and said aryl from about 6 to about 8 carbon atoms.

4. The polyurethane foam composition as defined in claim 1, said phosphorus-containing polymer being derived from triallyl phosphate.

5. The polyurethane foam composition as defined in claim 1, said phosphorus-containing polymer being present in an amount ranging from about 1 to about 30% by weight of said composition.

6. The polyurethane foam composition as defined in claim 5, said phosphorus-containing polymer being derived from triallyl phosphate.

7. The polyurethane foam composition as defined in claim 1, said foam composition ranging from a flexible to a rigid foam.

8. The polyurethane foam composition as defined in claim 1, said phosphorus-containing polymer being present in an amount ranging from about 1 to about 20% by weight of said composition.

9. A process for preparing a fire resistant polyether based polyurethane foam composition which comprises mixing a polyol and a polyisocyanate, with a phosphorus-containing ethylenic monomer, said monomer being inert toward said polyol and said polyisocyanate, said monomer selected from the group consisting of:

wherein $R_1$, $R_2$, $R_3$ and $R_4$ are each selected from the group consisting of H, alkyl of from about 1 to about 20 carbon atoms, aryl of from 6 to about 24 carbon atoms, and halogen; and X is vinyl or allyl, and simultaneously but separately polymerizing said polyol and said polyisocyanate to form polyurethane, and said phosphorus-containing ethylenic monomer to form a polymer thereof, said last mentioned polymer and said polyurethane forming an interpenetrating network of the two polymers, said phosphorus atom being present as a pendant group on the polymer derived from said ethylenic monomer.

10. The process as defined in claim 9, said polymerizing taking place in the presence of a catalyst for polymerizing said polyol and said polyisocyanate, and a catalyst for polymerizing said phosphorus-containing ethylenic monomer.

11. The process as defined in claim 10, said first mentioned catalyst being an amino or tin compound, and said last mentioned catalyst being an organic peroxide.

12. The process as defined in claim 9, the amount of said phosphorus-containing monomer ranging from about 1 to about 60% by weight of the polyol component.

13. The process as defined in claim 9, the amount of said phosphorus-containing monomer ranging from about 5 to about 20% by weight of the polyol component.

14. The process as defined in claim 9, the temperature of the polymerization reaction ranging from about 20° to about 160° C.

15. The process as defined in claim 12, the temperature of the polymerization reaction ranging from about 20° to about 160° C.

16. The process as defined in claim 9, the temperature of the polymerization reaction ranging from about 20° to about 140° C.

17. The process as defined in claim 9, the amount of said phosphorus-containing monomer ranging from about 1 to about 60% by weight of the polyol component.

18. The process as defined in claim 9, said phosphorus-containing ethylenic monomer being triallyl phosphate.

19. The process as defined in claim 12, said phosphorus-containing ethylenic monomer being triallyl phosphate.

20. The process as defined in claim 15, said phosphorus-containing ethylenic monomer being triallyl phosphate.

* * * * *